US012704409B1

(12) United States Patent
Zhai et al.

(10) Patent No.: US 12,704,409 B1
(45) Date of Patent: Aug. 11, 2026

(54) MULTI-WAVELENGTH FIBER-OPTIC IMAGING DEVICE AND SYSTEM

(71) Applicants: Beijing Transcend Vivoscope Bio-Technology Co., Ltd., Beijing (CN); Peking University, Beijing (CN)

(72) Inventors: Muyue Zhai, Beijing (CN); Aimin Wang, Beijing (CN); Guoxi Zhang, Beijing (CN); Heping Cheng, Beijing (CN)

(73) Assignees: Beijing Transcend Vivoscope Bio-Technology Co., Ltd., Beijing (CN); Peking University, Beijing (CN)

( * ) Notice: Subject to any disclaimer, the term of this patent is extended or adjusted under 35 U.S.C. 154(b) by 0 days.

(21) Appl. No.: 19/356,807

(22) Filed: Oct. 13, 2025

(30) Foreign Application Priority Data

Aug. 6, 2025 (CN) ........................ 202511100253.0

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0208* (2013.01); *G01J 3/021* (2013.01); *G01J 3/06* (2013.01);
(Continued)

(58) Field of Classification Search
CPC ........ G01J 3/2823; G01J 3/0208; G01J 3/021; G01J 3/06; G01J 3/10; G01J 3/433; G01J 2003/104; G01J 2003/2826
See application file for complete search history.

(56) References Cited

U.S. PATENT DOCUMENTS

2005/0020877 A1* 1/2005 Ishihara ................... A61B 1/04 600/109
2005/0024719 A1* 2/2005 Nakata ............... G02B 6/02366 359/368

(Continued)

FOREIGN PATENT DOCUMENTS

CN 2557964 Y 6/2003
CN 103762502 A 4/2014

(Continued)

OTHER PUBLICATIONS

First Office Action issued in counterpart Chinese Patent Application No. 202511100253.0, dated Jan. 29, 2026.

*Primary Examiner* — Abdullahi Nur
(74) *Attorney, Agent, or Firm* — Westbridge IP LLC

(57) ABSTRACT

A multi-wavelength fiber-optic imaging device includes a plurality of optical fibers, a scanner, and an objective lens. By providing the plurality of optical fibers, which may have different specifications, a plurality of first light beams with different wavelengths can be respectively transmitted to the scanner. The scanner changes propagation directions of the plurality of first light beams with different wavelengths and scans a target tissue. And the plurality of first light beams with different wavelengths are focused on the target tissue by the objective lens, so as to conduct imaging of the target tissue. The multi-wavelength fiber-optic imaging device realizes separate transmission of the plurality of first light beams with different wavelengths, expands a wavelength range of working light beams transmitted by the imaging device, and uses the plurality of first light beams with different wavelengths to conduct imaging of the target tissue.

17 Claims, 6 Drawing Sheets

(51) Int. Cl.

| | |
|---|---|
| ***G01J 3/06*** | (2006.01) |
| ***G01J 3/10*** | (2006.01) |
| ***G01J 3/433*** | (2006.01) |

(52) U.S. Cl.

CPC ................. *G01J 3/10* (2013.01); *G01J 3/433* (2013.01); *G01J 2003/104* (2013.01); *G01J 2003/2826* (2013.01)

(56) References Cited

U.S. PATENT DOCUMENTS

| | | | | |
|---|---|---|---|---|
| 2006/0033988 | A1 * | 2/2006 | Mikuriya | G02B 21/0024 359/368 |
| 2014/0240951 | A1 * | 8/2014 | Brady | G01J 3/0218 362/583 |
| 2014/0316282 | A1 * | 10/2014 | Hendriks | A61B 5/0084 600/478 |
| 2015/0285613 | A1 * | 10/2015 | Kilpatrick | G01M 7/025 356/477 |
| 2017/0255110 | A1 * | 9/2017 | Richter | G03F 7/70383 |
| 2019/0137401 | A1 * | 5/2019 | Ozeki | G01J 3/10 |
| 2020/0376600 | A1 * | 12/2020 | Aggarwal | G02B 6/4296 |
| 2022/0197002 | A1 * | 6/2022 | Cang | G01N 21/6402 |

FOREIGN PATENT DOCUMENTS

| | | | | |
|---|---|---|---|---|
| CN | 106859579 | A | 6/2017 | |
| CN | 119247609 | A | 1/2025 | |
| WO | WO-2011069261 | A1 * | 6/2011 | G02B 21/0032 |

* cited by examiner

MULTI-WAVELENGTH FIBER-OPTIC IMAGING DEVICE AND SYSTEM

CROSS-REFERENCE TO RELATED APPLICATIONS

This application claims priority to Chinese Patent Application No. 202511100253.0, filed on Aug. 6, 2025, which is hereby incorporated by reference in its entirety.

TECHNICAL FIELD

The present disclosure relates to the field of biomedical imaging technologies, and in particular, to a multi-wavelength fiber-optic imaging device and system.

BACKGROUND

In a fiber-optic imaging system, illumination light or imaging light is transmitted through an optical fiber. With a flexible light-transmitting characteristic of the optical fiber, endoscopic imaging may be realized by the fiber-optic imaging system by inserting the optical fiber into the interior of a human body or an animal, and a design of a wearable or handheld optical imaging system may be realized. A distal-end scanning fiber-optic imaging system uses an optical fiber to transmit illumination and imaging light energy, and utilizes a mechanical or optical scanning component disposed at the distal end to achieve two-dimensional or three-dimensional scanning imaging, which has the advantages of high resolution, low crosstalk, high flexibility, and the like. In addition, by combining with confocal, optical coherence tomography, and multi-photon imaging, the fiber-optic imaging system has developed a series of imaging technologies including fiber-based confocal imaging, fiber-based multi-photon imaging, fiber-based optical coherence tomography, and the like, and becomes a powerful tool for scientific research and disease diagnosis in the fields of life sciences and medicine.

However, imaging wavelength obtained by the conventional fiber-optic imaging system is limited, and a higher requirement for multi-wavelength imaging in modern scientific research and clinical diagnosis cannot be met.

SUMMARY

In view of this, embodiments of the present disclosure provide a multi-wavelength fiber-optic imaging device and system based on multi-channel optical fiber, so as to breakthrough the limitation of wavelength range transmitted by conventional fiber-optic imaging system.

In a first aspect, an embodiment of the present disclosure provides a multi-wavelength fiber-optic imaging device, including: a plurality of optical fibers, configured to transmit a plurality of first light beams respectively, where the plurality of first light beams transmitted by the plurality of optical fibers are different in wavelengths, a first end of an optical fiber is configured to receive a first light beam, and a second end of the optical fiber is configured to output the first light beam; a scanner, disposed at a first-light-beam output side of the plurality of optical fibers, configured to receive the plurality of first light beams emitted from second ends of the plurality of optical fibers and change propagation directions of the plurality of first light beams to realize imaging scanning; and an objective lens, disposed at a first-light-beam output side of the scanner, configured to focus the plurality of first light beams on the target tissue, to conduct imaging of the target tissue.

In a second aspect, a multi-wavelength fiber-optic imaging system is provided, where the system includes: the multi-wavelength fiber-optic imaging device according to any one of the above embodiments in the first aspect; and a multi-wavelength light source, disposed at the first-light-beam receiving side of the plurality of optical fibers, configured to provide the plurality of first light beams with different wavelengths to the first ends of the plurality of optical fibers respectively.

According to the multi-wavelength fiber-optic imaging device in the embodiment of the present disclosure, the multi-wavelength fiber-optic imaging device includes a plurality of optical fibers, a scanner, and an objective lens. By providing the plurality of optical fibers, which may have different specifications, a plurality of first light beams with different wavelengths may be transmitted to the scanner respectively. The scanner changes propagation directions of the plurality of first light beams with different wavelengths and performs scanning on a target tissue. The plurality of first light beams with different wavelengths are focused on the target tissue by the objective lens, so as to conduct imaging of the target tissue. The multi-wavelength fiber-optic imaging device realizes transmission of the plurality of first light beams with different wavelengths separately, expands a wavelength range of illumination or excitation transmitted by the imaging device. And the target tissue could be illuminated or excited by the plurality of first light beams with different wavelengths, so that more imaging information of the target tissue is provided to meet an imaging requirement of a complex application scenario.

BRIEF DESCRIPTION OF THE DRAWINGS

By providing a more detailed description of the embodiments of the present disclosure with reference to accompanying drawings, the above and other purposes, features, and advantages of the present disclosure become more apparent. The accompanying drawings are used to provide a further understanding of the embodiments of the present disclosure and form a part of the specification. The accompanying drawings are used together with the embodiments of the present disclosure to explain the present disclosure, and do not constitute a limitation on the present disclosure. In the drawings, the same reference number usually represents the same component or step.

DETAILED DESCRIPTION OF THE EMBODIMENTS

Technical solutions in embodiments of the present disclosure will be clearly and completely described below with reference to accompanying drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure.

In a fiber-optic imaging system, illumination or excitation light and imaging light are transmitted through optical fibers. With a flexible light-transmitting characteristic of the optical fiber, endoscopic imaging may be realized by the fiber-optic imaging system by inserting the optical fiber into the interior of a human body or an animal, and a design of a wearable or handheld optical imaging system may be realized. Illumination or excitation light and imaging light are transmitted by optical fibers for distal-end scanning of the fiber-optic imaging system and a mechanical or optical scanning component disposed at the distal end may be used to perform two-dimensional or three-dimensional imaging scanning, which has advantages of high resolution, low crosstalk, high flexibility, and the like. In addition, by combining with confocal, optical coherence tomography, and multi-photon imaging, the fiber-optic imaging system has developed a series of imaging technologies including fiber-based confocal imaging, fiber-based multi-photon imaging, fiber-based optical coherence tomography, and the like, and becomes a powerful tool for scientific research and disease diagnosis in the fields of life sciences and medicine.

However, a conventional fiber-optic imaging device mainly relies on a single narrow-band-wavelength light beam to irradiate a target tissue for imaging, resulting in that only information of the target tissue at the illumination of a single wavelength may be obtained, which limits the information of imaging wavelength acquired by the fiber-optic imaging device. In-depth understanding and analysis of the target tissue is restricted, and a higher requirement for imaging multi-wavelength imaging information in modern scientific research and clinical diagnosis cannot be met.

To solve the above problems, the present disclosure provides a multi-wavelength fiber-optic imaging device based on multi-channel optical fiber, so as to provide an imaging tool capable of obtaining more imaging information with multi-wavelength for scientific research and clinical diagnosis.

Figure 1:
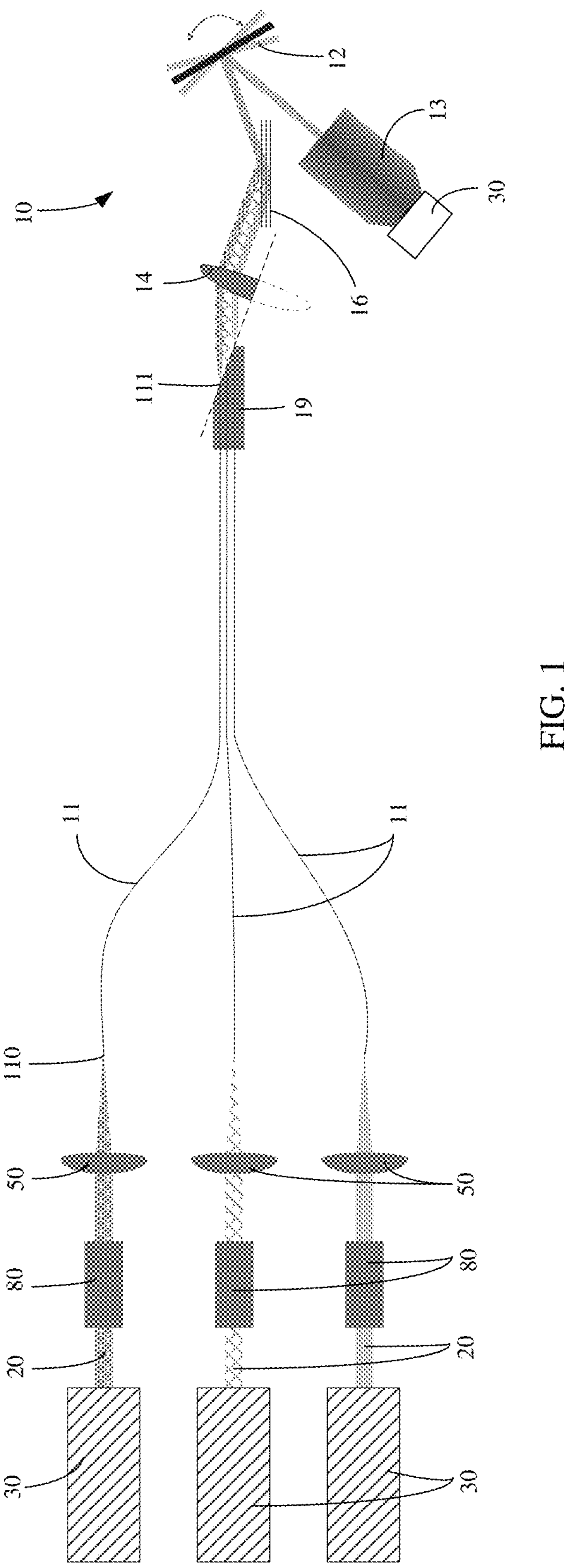
FIG. 1 is a schematic structural diagram of an application scenario applicable to a multi-wavelength fiber-optic imaging device according to an embodiment of the present disclosure.
Figure 2:
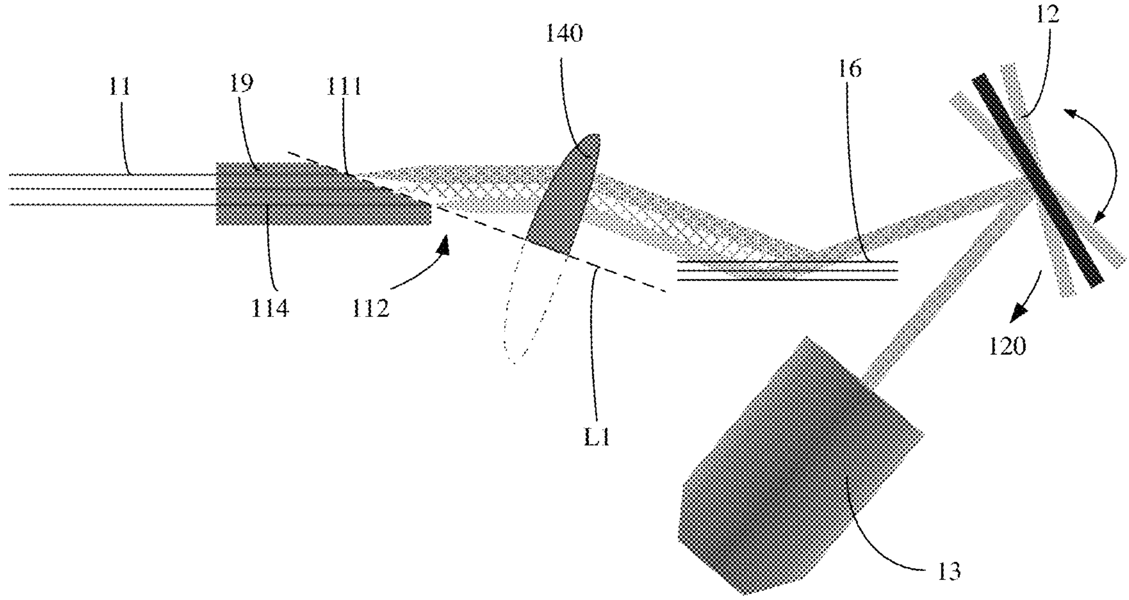
FIG. 2 is a schematic structural diagram of an application scenario applicable to a multi-wavelength fiber-optic imaging device according to another embodiment of the present disclosure.

FIG. 1 is a schematic structural diagram of an application scenario applicable to a multi-wavelength fiber-optic imaging device according to an embodiment of the present disclosure. FIG. 2 is a schematic structural diagram of an application scenario applicable to a multi-wavelength fiber-optic imaging device according to another embodiment of the present disclosure. For ease of understanding, the multi-wavelength fiber-optic imaging device provided in the embodiment is described in detail below with reference to FIG. 1 and FIG. 2. A multi-wavelength fiber-optic imaging device 10 includes: a plurality of optical fibers 11, a scanner 12, and an objective lens 13.

The plurality of optical fibers 11 are configured to transmit a plurality of first light beams 20 respectively. Wavelengths of the plurality of first light beams 20 transmitted by the plurality of optical fibers 11 are different. A first end of an optical fiber 110 is configured to receive a first light beam 20. A second end of the optical fiber 111 is configured to output the first light beam 20.

Specifically, the optical fiber 11 is configured to transmit the first light beam 20. The plurality of optical fibers 11 are configured to transmit the plurality of first light beams 20 with wavelengths in different spectral ranges, respectively. The first light beam 20 may be transmitted by the optical fiber 11 from the first end of the optical fiber 110 to the second end of the optical fiber 111. Exemplarily, both the first end and the second end of the optical fiber may be ends of the optical fiber.

Exemplarily, the first light beam may be configured as illumination light or excitation light. Exemplarily, the first light beam may be visible light, ultraviolet light or infrared light. Exemplarily, the first light beam may be a red-light beam, a blue-light beam, or a green-light beam. Exemplarily, a quantity of the optical fibers may be the same as a quantity of wavelength types of the first light beams. Each wavelength corresponds to a wavelength type.

Exemplarily, a material and structure of the optical fiber may be selected based on the wavelength of the first light beam that the optical fiber needs to transmit. Exemplarily, the optical fiber may include a quartz optical fiber or an optical fiber of a composite material. For example, the optical fiber may be the optical fiber of the composite material, and the optical fiber of the composite material may include a plastic cladding and a liquid fiber core. Exemplarily, the optical fiber may include photonic crystal fiber and anti-resonant hollow-core fiber. Exemplarily, specifications of the plurality of optical fibers may be different from each other.

The scanner 12 is located at a first-light-beam output end of the plurality of optical fibers 112, and is configured to receive the plurality of first light beams 20 output by the second ends of the plurality of optical fibers 111 and change propagation directions of the plurality of first light beams 20, to image a target tissue 30 by scanning the plurality of first light beams 20.

Specifically, the first-light-beam output side of the optical fiber 112 is a side of the optical fiber 11 configured to output the first light beam 20. Further, the first-light-beam output side of the optical fiber 112 is a side of the second end of the optical fiber 111 configured to output the first light beam 20. The first light beams 20 emitted from the plurality of optical fibers 11 may be received by the scanner 12. Exemplarily, the first light beams emitted from all the optical fibers may be received by the scanner 12. Exemplarily, the scanner 12 is configured to change emitting angles of the first light beams to perform two-dimensional planar scanning or three-dimensional volumetric scanning on the target tissue 30. Exemplarily, the scanner 12 may include a mechanical scanner. For example, the scanner may include a motor and a galvanometer mirror or a rotating mirror. Exemplarily, the scanner 12 may alternatively include an optical scanner. For example, the scanner may include a prism, a grating, an acousto-optic crystal, or an electro-optic crystal.

The objective lens 13 is located at a first-light-beam output side of the scanner 120, and is configured to focus the plurality of first light beams 20 on the target tissue 30, so as to conduct imaging of the target tissue 30.

Specifically, the first-light-beam output side of the scanner 120 is a side of the scanner 12 configured to output the first light beams 20. Exemplarily, the objective lens may be a lens group composed of several lenses, or a single lens. Exemplarily, the objective lens is configured to focus the first light beams on the target tissue 30. Exemplarily, the target tissue 30 may include a biological tissue.

In some application scenarios, after receiving the first light beams 20 transmitted from the plurality of second ends of the optical fibers 111, the scanner 12 is configured to change the propagation directions of the first light beams 20 in both tilt and pitch directions, so as to scan one or more two-dimensional planes of the target tissue 30 by using the plurality of first light beams 20. The objective lens 13 is configured to focus the plurality of first light beams 20 on a scanned two-dimensional plane, so as to conduct imaging of the target tissue 30.

In some application scenarios, referring to FIG. 1, the multi-wavelength fiber-optic imaging device 10 may include three optical fibers 11. The first light beams 20 may include a red-light beam, a blue-light beam, or a green-light beam. The three optical fibers 11 are configured to transmit the red-light beam, the blue-light beam, and the green-light beam, respectively. The red-light beam, the blue-light beam, and the green-light beam are all received by the scanner 12. The scanner 12 is configured to scan the target tissue 30 by using the red-light beam, blue-light beam, and green-light beam at the same time. And the objective lens 13 is configured to output the red-light beam, the blue-light beam, and the green-light beam to the target tissue 30 at the same time. In the multi-wavelength fiber-optic imaging device 10, the target tissue 30 may be irradiated by the red-light beam, the blue-light beam, and the green-light beam at the same time, so that multi-color imaging of the target tissue 30 is realized, thereby providing more imaging information.

In some application scenarios, the target tissue 30 may include a plurality of sub-target tissues. Different sub-target tissues may be marked by fluorescent dyes with different excitation wavelengths. With the multi-wavelength fiber-optic imaging device directing the first light beams with different wavelengths towards the target tissue, distribution of each sub-target tissue may be acquired, so that tissue structure distribution of the target tissue may be obtained, thereby providing more structural information and diagnostic basis for scientific research or clinical disease diagnosis.

In some application scenarios, when the first light beams with different wavelengths reach the target tissue through the scanner and the objective lens, second light beams with different wavelengths are emitted from the target tissue as feedback for the first light beams with different wavelengths. In some implementations, the objective lens is further configured to receive the second light beams with different wavelengths. The multi-wavelength fiber-optic imaging device may further include a dichroic mirror and an imaging optical fiber. The dichroic mirror is disposed between the objective lens and the scanner, and is capable of transmitting the plurality of first light beams and reflecting the plurality of second light beams. One end of the imaging optical fiber is disposed at a second-light-beam output side of the dichroic mirror, and is configured to receive the plurality of second light beams reflected by the dichroic mirror. The other end of the imaging optical fiber is configured to output the plurality of second light beams reflected by the dichroic mirror, so that the plurality of second light beams may be collected. In other implementations, the plurality of second light beams are collected after passing through the objective lens, the scanner, and the plurality of optical fibers in sequence.

Exemplarily, the multi-wavelength fiber-optic imaging device may further include one or more optical fiber sleeves. One optical fiber sleeve may be sleeved outside one or more optical fibers.

Exemplarily, the multi-wavelength fiber-optic imaging device may be a multi-wavelength fiber-optic imaging device based on multi-channel optical fiber transmission.

The multi-wavelength fiber-optic imaging device provided by the embodiments of the present disclosure, includes a plurality of optical fibers, a scanner, and an objective lens. By providing the plurality of optical fibers, which may have different specifications, a plurality of first light beams with different wavelengths may be transmitted to the scanner, respectively. The scanner is configured to change propagation directions of the plurality of first light beams with different wavelengths and perform scanning to a target tissue. The plurality of first light beams with different wavelengths are focused on the target tissue by the objective lens, so as to conduct imaging of the target tissue. Separate transmission of the plurality of first light beams with different wavelengths is realized by the multi-wavelength fiber-optic imaging device, thereby expanding a wavelength range of illumination or excitation light transmitted by the multi-wavelength fiber-optic imaging device. By utilizing the plurality of first light beams with different wavelengths to conduct imaging of the target tissue, more imaging information of the target tissue may be acquired, thereby satisfying an imaging requirement of a complex application scenario.

In some embodiments, as shown in FIG. 1 and FIG. 2, the multi-wavelength fiber-optic imaging device 10 may further include a collimating optical element 14. The collimating optical element 14 is disposed between the plurality of optical fibers 11 and the scanner 12, and is configured to collimate the first light beams 20 output by the second ends of the plurality of optical fibers 111.

Specifically, the collimating optical element 14 is capable of collimating the first light beams 20 output by the plurality of optical fibers 11. Exemplarily, the collimating optical element 14 can collimate the first light beams 20 output by all the optical fibers 11. Exemplarily, the collimating optical element may include a lens or a lens group. Exemplarily, the collimating optical element may include an achromatic cemented lens.

Exemplarily, the collimating optical element may have two opposite sides. The second ends of the plurality of optical fibers may be disposed at a side of the collimating optical element, and the scanner may be disposed at the other side of the collimating optical element.

The multi-wavelength fiber-optic imaging device provided by the embodiments of the present disclosure, further includes the collimating optical element disposed between the plurality of optical fibers and the scanner. The collimating optical element is configured to collimate the first light beams output by the plurality of optical fibers, thereby simplifying a structure of the multi-wavelength fiber-optic imaging device and reducing structural complexity of the multi-wavelength fiber-optic imaging device.

Figure 3:
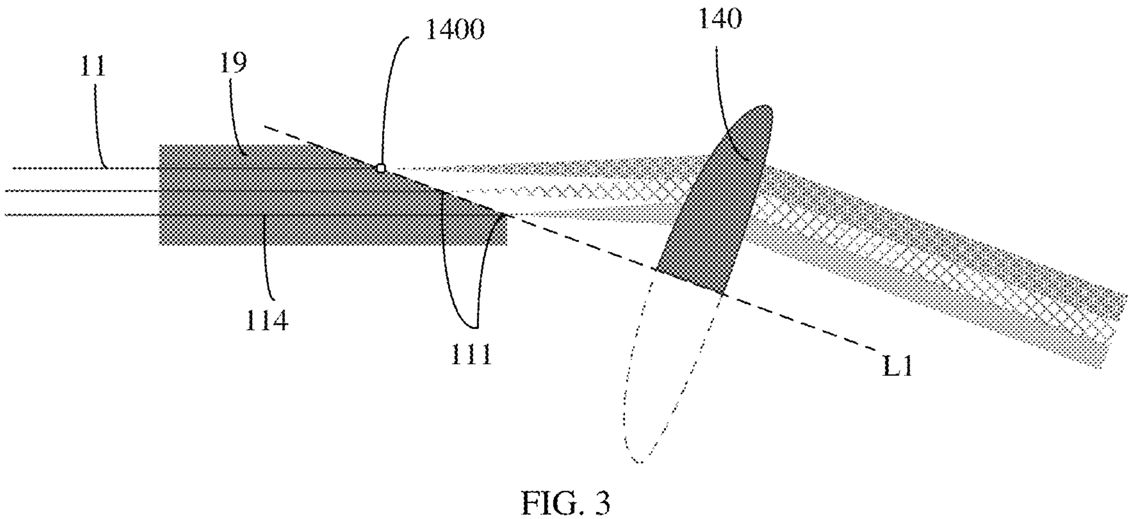
FIG. 3 is a schematic structural diagram of an application scenario applicable to optical fibers and a first collimating lens according to an embodiment of the present disclosure.
Figure 4:
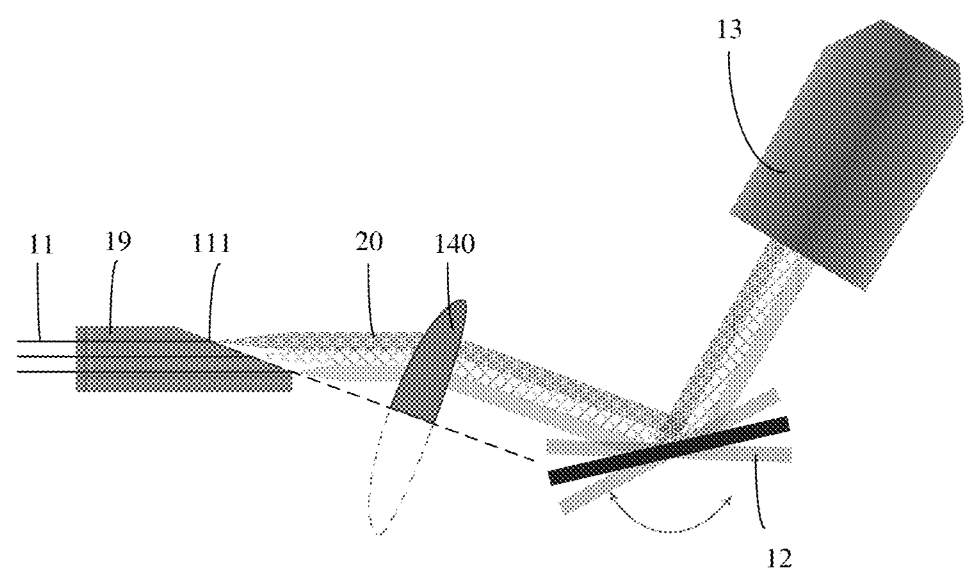
FIG. 4 is a schematic structural diagram of an application scenario applicable to a multi-wavelength fiber-optic imaging device according to still another embodiment of the present disclosure.

FIG. 3 is a schematic structural diagram of an application scenario applicable to optical fibers and a first collimating lens according to an embodiment of the present disclosure. FIG. 4 is a schematic structural diagram of an application scenario applicable to a multi-wavelength fiber-optic imaging device according to still another embodiment of the present disclosure.

In some embodiments, as shown in FIG. 2 to FIG. 4, the collimating optical element 14 may include a first collimating lens 140. The first collimating lens 140 is disposed between the plurality of optical fibers 11 and the scanner 12, and is configured to collimate the first light beams 20 output from the second ends of the plurality of optical fibers 111. The first collimating lens 140 has a first main optical axis L1.

The first collimating lens 140 has a plurality of first focal points 1400 disposed at the first main optical axis L1. The plurality of first focal points 1400 correspond to the wavelengths of the plurality of first light beams 20 respectively. The second end of the optical fiber 111 corresponding to a first light beam 20 is located at a first focal point 1400 corresponding to the same first light beam 20, so that the propagation directions of the plurality of first light beams 20 emitted from the first collimating lens 140 are parallel. Specifically, after the plurality of first light beams 20 are collimated by the first collimating lens 140, the propagation directions of the plurality of first light beams 20 are all parallel to the first main optical axis L1. The plurality of first light beams 20 are directed to the same direction.

Specifically, the second end of the optical fiber 111 may be a tail end of the optical fiber 11. Since the plurality of first light beams 20 are different in wavelengths, different first light beams 20 correspond to different first focal points 1400. The plurality of first focal points 1400 are all disposed at the first main optical axis L1 and arranged at intervals along the first main optical axis L1 of the first collimating lens 140. The first light beams 20 output by the second ends of the plurality of optical fibers 111 are directed from the corresponding first focal points 1400 to the first collimating lens 140, so that collimation of the plurality of first light beams 20 is realized.

Exemplarily, the second end of the optical fiber 111 may be an end face of the tail end of the optical fiber 11. A center point of the end face is located at the first focal point 1400.

Exemplarily, as shown in FIG. 3, the first collimating lens 140 may have two opposite sides. The second ends of the plurality of optical fibers 111 may be disposed at one side of the first collimating lens 140, and the scanner 12 may be disposed at the other side of the first collimating lens 140. The plurality of first focal points 1400 and the second ends of the plurality of optical fibers 111 may be disposed at the same side of the first collimating lens 140.

Exemplarily, as shown in FIG. 3, in each optical fiber 11, the second end of the optical fiber 111 may be a tail end of a second end portion of the optical fiber 114. Extension directions of second end portions of the plurality of optical fibers 114 may be parallel to each other. The extension directions of the second end portions of the optical fibers 114 may be arranged to cross an extension direction of the first main optical axis L1. The extension directions of the second end portions of the plurality of optical fibers 114 are parallel to each other, facilitating reduction in an overall circumferential size of the second end portions of the plurality of optical fibers 114, so that a circumferential size of the multi-wavelength fiber-optic imaging device 10 may be set to small. Meanwhile, a total area of light spots of beams corresponding to the plurality of first light beams 20 may be reduced. Thus, a volume of the first collimating lens 140 may be set to be small while meeting a requirement for collimation on the plurality of first light beams 20, thereby facilitating reduction in a volume and weight of the multi-wavelength fiber-optic imaging device 10.

Exemplarily, as shown in FIG. 3, the multi-wavelength fiber-optic imaging device 10 may further include a first optical fiber ferrule 19. The second end portions of the plurality of optical fibers 114 may be inserted into the same first optical fiber ferrule 19 to realize fixation of the second end portions of the plurality of optical fibers 114, which also facilitates reduction in an overall circumferential size of the second end portions of the plurality of optical fibers 114.

Exemplarily, as shown in FIG. 3, on a plane passing through central lines of the second end portions of the plurality of optical fibers 114 and the first main optical axis L1, orthographic projections of the second end portions of the plurality of optical fibers 114 are disposed at a side of the first main optical axis L1, and an orthographic projection of the first collimating lens 140 is disposed at the other side of the first main optical axis L1. Thus, on the plane passing through the central lines of the second end portions of the plurality of optical fibers 114 and the first main optical axis L1, the first light beams 20 transmitted by the plurality of optical fibers 11 can exit to the same side of the first main optical axis L1, so that only a part, disposed at the other side of the first main optical axis L1, of the first collimating lens 140 need to be retained, making it is possible to set a volume of the first collimating lens 140 to be small. Exemplarily, on a plane perpendicular to the first main optical axis L1, a shape of the orthographic projection of the first collimating lens 140 may include a sector. Exemplarily, the first collimating lens 140 may be formed by cutting a conventional collimating lens. The first collimating lens 140 may be a part, used for transmitting the plurality of first light beams 20, of the conventional collimating lens.

Exemplarily, as shown in FIG. 4, the plurality of first light beams 20 may pass through the first collimating lens 140, the scanner 12, and the objective lens 13 in sequence and then reach the target tissue 30. In other words, the plurality of first light beams 20 collimated by the first collimating lens 140 may not be combined before reaching the target tissue 30. Thus, a structure of the multi-wavelength fiber-optic imaging device may be simplified, and a volume and weight of the multi-wavelength fiber-optic imaging device may be reduced, thereby satisfying requirements for miniaturization and light weight of the multi-wavelength fiber-optic imaging device, and enabling the multi-wavelength fiber-optic imaging device to be applied to application scenarios with high requirements on volume and weight. For example, the multi-wavelength fiber-optic imaging device may be used as an endoscope to observe an internal cavity of animals or humans.

According to the multi-wavelength fiber-optic imaging device provided by the embodiment, the first collimating lens serves as a collimating optical element to collimate the first light beams transmitted by the plurality of optical fibers.

Since the plurality of first light beams are different in wavelengths, different first light beams correspond to different first focal points of the first collimating lens. By disposing the second end of the optical fiber corresponding to a first light beam at the first focal point corresponding to the same first light beam, collimation of the first light beams transmitted by the plurality of optical fibers is realized. Meanwhile, the plurality of first light beams collimated by the first collimating lens are directed to have the same beam direction, and propagation directions of the plurality of first light beams are parallel, facilitating to realize imaging of the target tissue without beam combination through the plurality of first light beams collimated by the first collimating lens.

In some embodiments, the first collimating lens 140 may include a lens with an Abbe number less than a preset value, so as to increase a distance between adjacent first focal points 1400. The first collimating lens 140 may alternatively include a lens group, so as to adjust the distance between adjacent first focal points 1400.

Since the first collimating lens includes the lens with the Abbe number less than the preset value or is formed by the lens group, dispersion of the first collimating lens can be enhanced to increase the distance between adjacent first focal points, so that there is sufficient physical space for arrangement of the second ends of the optical fibers.

Exemplarily, the preset value may be less than or equal to 60. For example, the first collimating lens may include a lens with an Abbe number less than or equal to 60. For example, the Abbe number of the lens included in the first collimating lens may be 30, 40, or 60. Exemplarily, the first collimating lens may be an aspherical lens.

Exemplarily, the first collimating lens may include a lens group, and the lens group may be formed by fixing a plurality of lenses of different materials through a mechanical structure or by cementing.

Figure 5:
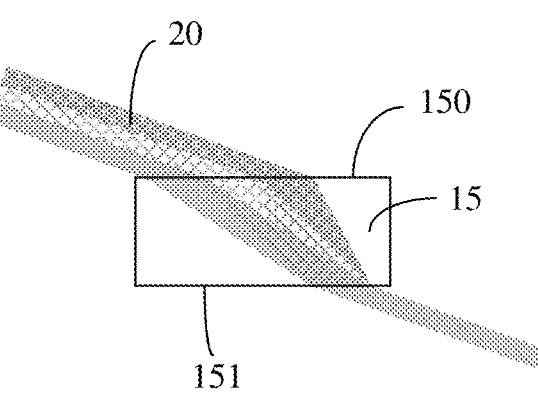
FIG. 5 is a schematic structural diagram of an application scenario applicable to a first beam-combining optical element according to an embodiment of the present disclosure.

FIG. 5 is a schematic structural diagram of an application scenario applicable to a first beam-combining optical element according to an embodiment of the present disclosure. Referring to FIG. 2 and FIG. 5, the multi-wavelength fiber-optic imaging device 10 may further include a first beam-combining optical element 15.

The first beam-combining optical element 15 is disposed between the first collimating lens 140 and the scanner 12. The first beam-combining optical element 15 has a first refractive surface 150 and a second refractive surface 151 parallel to each other. When the plurality of first light beams 20 with parallel propagation directions propagate to the first refractive surface 150, incident angles of first light beams 20 are greater than 0° and less than 90°. The plurality of first light beams 20 are capable of entering the first beam-combining optical element 15 from the first refractive surface 150 and emitted from the first beam-combining optical element 15 from the second refractive surface 151. After the plurality of first light beams 20 exit from the second refractive surface 151, the propagation directions of the plurality of first light beams 20 coincide.

In some application scenarios, as shown in FIG. 5, after the plurality of first light beams 20 are collimated by the first collimating lens 140, the plurality of first light beams 20 are directed to the same beam direction. The propagation directions of the plurality of first light beams 20 are parallel but not coincident, so that there is a tiny distance between centroids of light spots of beams corresponding to the plurality of first light beams 20, and the centroids of light spots of beams corresponding to the plurality of first light beams 20 do not coincide with each other. Since the incident angles of the first light beams 20 are greater than 0° and less than 90° when the first light beams 20 propagate to the first refractive surface 150, the first light beams 20 can be refracted when entering the first beam-combining optical element 15 through the first refractive surface 150. Since the first refractive surface 150 and the second refractive surface 151 are parallel, the first light beams 20 have a lateral displacement when emitted from the first beam-combining optical element 15.

Since the wavelengths of the plurality of first light beams 20 are different, the first beam-combining optical element 15 exhibits different refractive indices for the first light beams 20 with different wavelengths. After the plurality of first light beams 20 enter the first beam-combining optical element 15 from the first refractive surface 150 and exit the first beam-combining optical element 15 from the second refractive surface 151, the lateral displacements of the plurality of first light beams 20 are different, so that the centroids of the light spots of the beams corresponding to the plurality of first light beams 20 may coincide, and the propagation directions of the plurality of first light beams 20 may coincide, thereby realizing combination of the beams corresponding to the plurality of first light beams 20.

Exemplarily, the first beam-combining optical element may include one or more optical glass plates. Exemplarily, the propagation directions of the plurality of first light beams can be made to coincide by adjusting one or more of factors including an angle between the first light beam and the first refractive surface, a distance between the second refractive surface and the first refractive surface, and refractive index and dispersion characteristics of the first beam-combining optical element. Exemplarily, a quantity of first light beams with different wavelengths is two. By adjusting the angle between the first light beam and the first refractive surface, centroids of light spots of two collimated light beams formed by the two first light beams may be adjusted.

Exemplarily, referring to FIG. 2, the plurality of first light beams may pass through the first collimating lens, the first beam-combining optical element, the scanner, and the objective lens in sequence and then reach the target tissue.

The multi-wavelength fiber-optic imaging device provided by this embodiment, may further include the first beam-combining optical element. The first beam-combining optical element has the first refractive surface and the second refractive surface parallel to each other. The plurality of first light beams with parallel propagation directions after collimated by the first collimating lens are refracted when entering the first beam-combining optical element from the first refractive surface, and further refracted when emitted from the first beam-combining optical element from the second refractive surface. Since the plurality of first light beams are different in wavelengths, refractive indices of the first beam-combining optical element for the first light beams with different wavelengths are different, and lateral displacements of the plurality of first light beams are also different, so that the propagation directions of the plurality of first light beams can coincide, thereby realizing the combination of beams corresponding to the plurality of first light beams, and enabling the first light beams with different wavelengths to image the same area of the target tissue.

Figure 6:
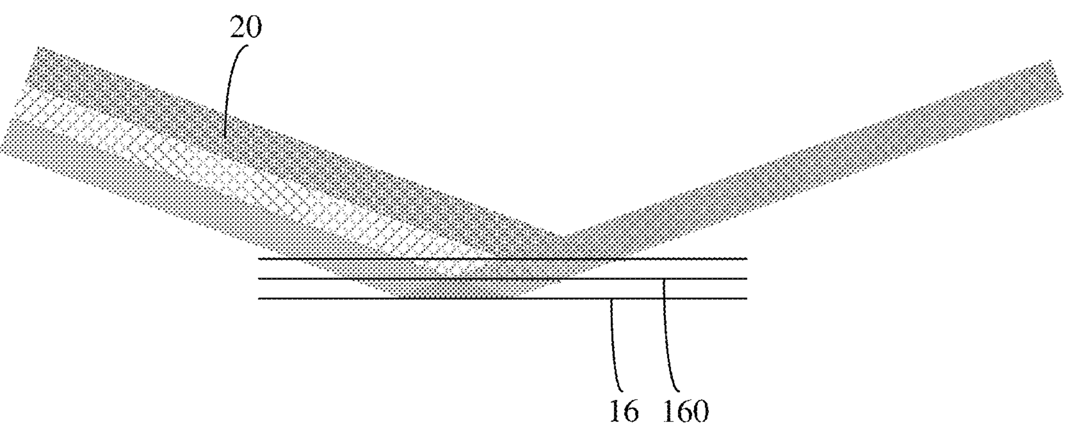
FIG. 6 is a schematic structural diagram of an application scenario applicable to a second beam-combining optical element according to an embodiment of the present disclosure.

FIG. 6 is a schematic structural diagram of an application scenario applicable to a second beam-combining optical element according to an embodiment of the present disclosure. As shown in FIG. 2 and FIG. 6, the multi-wavelength fiber-optic imaging device 10 may further include a second beam-combining optical element 16.

The second beam-combining optical element 16 is disposed between the first collimating lens 140 and the scanner 12. The second beam-combining optical element 16 includes a plurality of first optical coatings 160 arranged parallel to each other and spaced apart. The plurality of first optical coatings 160 are in one-to-one correspondence with the plurality of first light beams 20. Each first optical coating 160 is capable of reflecting the corresponding first light beam 20 and transmitting the first light beam 20 other than the corresponding first light beam 20, so that each first light beam 20 is capable of reaching the corresponding first optical coating 160, and after the plurality of first light beams 20 are respectively reflected by the corresponding first optical coatings 160, the propagation directions of the plurality of first light beams 20 coincide.

In some application scenarios, after the plurality of first light beams 20 are collimated by the first collimating lens 140, the plurality of first light beams 20 are directed to the same beam direction. The propagation directions of the plurality of first light beams 20 are parallel but not coincident, so that there is a tiny distance between centroids of light spots of beams corresponding to the plurality of first light beams 20, and the centroids of light spots of beams corresponding to the plurality of first light beams 20 do not coincide with each other. When the plurality of first light beams 20 propagate to the second beam-combining optical element 16, since the plurality of first optical coatings 160 are in one-to-one correspondence with the plurality of first light beams 20, each first optical coating 160 is capable of reflecting the corresponding first light beam 20 and transmitting the first light beam 20 other than the corresponding first light beam 20, so that each first light beam 20 is capable of reaching the corresponding first optical coating 160 and being reflected by the corresponding first optical coating 160.

Since the plurality of first optical coatings 160 are arranged parallel to each other and spaced apart and the propagation directions of the plurality of first light beams 20 are parallel, a lateral displacement of each first light beam 20 can be independently adjusted by adjusting a position of the first optical coating 160, so that centroids of light spots of beams corresponding to the plurality of first light beams 20 coincide and the propagation directions of the plurality of first light beams 20 coincide, so as to realize combination of the beams corresponding to the plurality of first light beams 20.

Exemplarily, when the plurality of first light beams 20 with parallel propagation directions propagate to the second beam-combining optical element 16, the propagation direction of each first light beam 20 is neither parallel nor perpendicular to the corresponding first optical coating 160.

Exemplarily, the plurality of first light beams may pass through the first collimating lens, the second beam-combining optical element, the scanner, and the objective lens in sequence and then reach the target tissue. Exemplarily, the plurality of first light beams may pass through the first collimating lens, the first beam-combining optical element, the second beam-combining optical element, the scanner, and the objective lens in sequence and then reach the target tissue.

Exemplarily, the first optical coating may include a dichroic film. Exemplarily, the first optical coating may alternatively include a narrow-band reflective film. The second beam-combining optical element may include a plurality of stacked optical glass plates, and a surface of each optical glass plate is coated with the first optical coating. Exemplarily, a quantity of optical glass plates may be the same as a quantity of wavelength types of the first light beams. The optical glass plate has a first plane and a second plane opposite to each other. The first plane of each optical glass plate is coated with a corresponding first optical coating.

The multi-wavelength fiber-optic imaging device provided by this embodiment, further includes the second beam-combining optical element. The second beam-combining optical element includes a plurality of first optical coatings arranged parallel to each other and spaced apart, and the plurality of first optical coatings are in one-to-one correspondence with the plurality of first light beams. Each first optical coating is capable of reflecting the corresponding first light beam and transmitting the first light beam other than the corresponding first light beam, so that each first light beam is capable of reaching the corresponding first optical coating and being reflected by the corresponding first optical coating, so that centroids of light spots of beams corresponding to the plurality of first light beams coincide and propagation directions of the plurality of first light beams collimated by the first collimating lens may coincide. Thus, combination of beams corresponding to the plurality of first light beams is realized, so that the same area of the target tissue may be imaged by the first light beams with different wavelengths.

In addition, a lateral displacement of the first light beam can be independently adjusted by adjusting a position of the first optical coating. For complex scenarios, such as when the quantity of wavelength types of the first light beams is large, the second beam-combining optical element can still achieve the combination of the beams corresponding to the plurality of first light beams, thereby expanding application scenarios of the multi-wavelength fiber-optic imaging device.

Figure 7:
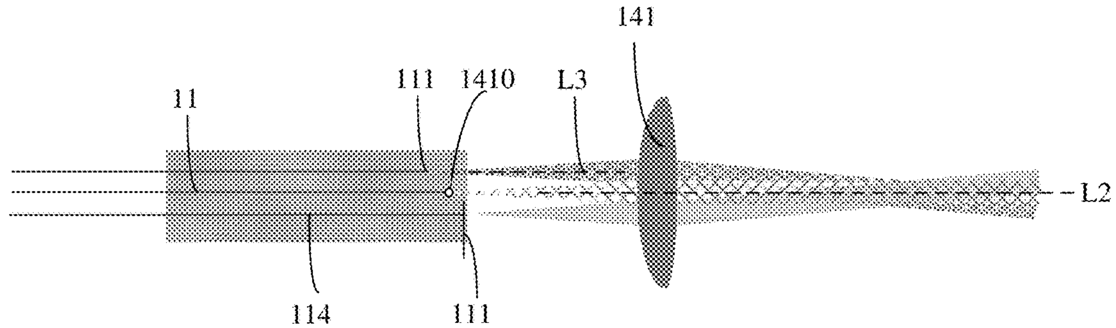
FIG. 7 is a schematic structural diagram of an application scenario applicable to optical fibers and a second collimating lens according to an embodiment of the present disclosure.
Figure 8:
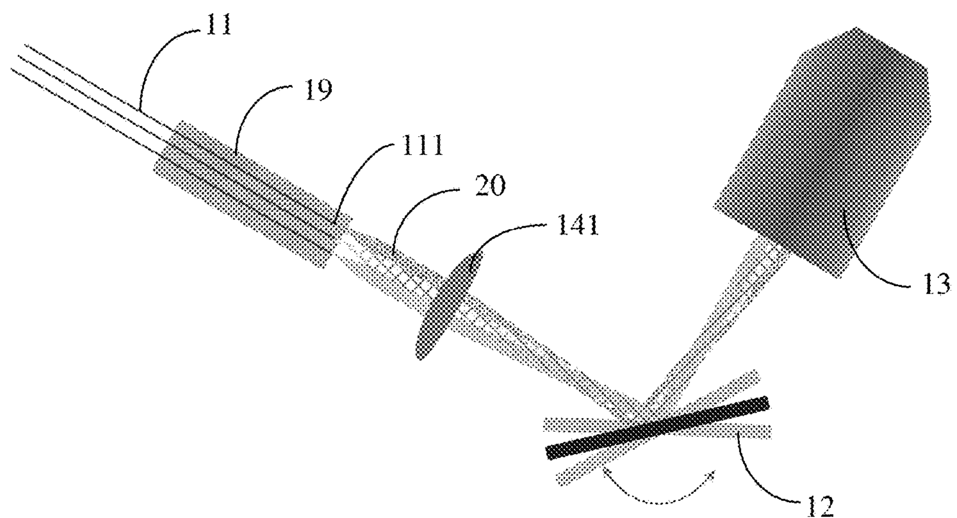
FIG. 8 is a schematic structural diagram of an application scenario applicable to a multi-wavelength fiber-optic imaging device according to still another embodiment of the present disclosure.

FIG. 7 is a schematic structural diagram of an application scenario applicable to optical fibers and a second collimating lens according to an embodiment of the present disclosure. FIG. 8 is a schematic structural diagram of an application scenario applicable to a multi-wavelength fiber-optic imaging device according to still another embodiment of the present disclosure.

As shown in FIG. 7 and FIG. 8, the collimating optical element 14 includes a second collimating lens 141. The second collimating lens 141 is disposed between the plurality of optical fibers 11 and the scanner 12, and is configured to collimate the first light beams 20 output by the second ends of the plurality of optical fibers 111. The second collimating lens 141 has a second main optical axis L2. An extension direction of a rotation axis L3 of a light cone formed by each first light beam 20 emitted from the second end of the optical fiber 111 is parallel to or coinciding with an extension direction of the second main optical axis L2.

Specifically, a light cone is formed by the first light beam 20 after being emitted from the second end of the optical fiber 111. The extension direction of the rotation axis L3 of the light cone formed by the first light beam 20 is parallel to or coincides with the second main optical axis L2.

In some implementations, extension directions of rotation axes of light cones formed by the first light beams 20 emitted from the second ends of the plurality of optical fibers 111 can all be parallel to the extension direction of the second main optical axis L2. In other implementations, among the first light beams 20 emitted from the second ends of the plurality of optical fibers 111, an extension direction of a rotation axis L3 of a light cone formed by one first light beam 20 can coincide with the extension direction of the second main optical axis L2, and extension directions of rotation axes L3 of light cones formed by the other first light beams 20 can all be parallel to the extension direction of the second main optical axis L2.

The second collimating lens 141 has a plurality of second focal points 1410 and a plurality of focal planes 1411. The plurality of second focal points 1410 are in one-to-one correspondence with the plurality of first light beams 20, and each focal plane 1411 includes a second focal point 1410. The second end of the optical fiber 111 corresponding to a first light beam 20 is located in the focal plane 1411 corresponding to the same first light beam 20.

Specifically, since the plurality of first light beams 20 are different in wavelengths, different first light beams 20 correspond to different second focal points 1410. Different second focal points 1410 are disposed at different focal planes 1411. The plurality of focal planes 1411 are perpendicular to the second main optical axis L2 and arranged at intervals. The second end of the optical fiber 111 corresponding to the first light beam 20 is disposed at the focal plane 1411 corresponding to the same first light beam 20, and the extension direction of the rotation axis L3 of the light cone formed by each first light beam 20 emitted from the second end of the optical fiber 111 is capable of being parallel to or coinciding with the extension direction of the second main optical axis L2, so that collimation of the plurality of first light beams 20 may be realized by the second collimating lens 141 simultaneous and axial chromatic aberration during the collimation of the plurality of first light beams 20 may be compensated.

Exemplarily, the second end of the optical fiber 111 may be an end face of a tail end of the optical fiber 11. Exemplarily, an extension direction of the second end portion of the optical fiber 114 may be parallel to or coincide with the extension direction of the second main optical axis L2.

Exemplarily, as shown in FIG. 8, the plurality of first light beams 20 may pass through the second collimating lens 141, the scanner 12, and the objective lens 13 in sequence and then reach the target tissue 30. In other words, the plurality of first light beams collimated by the second collimating lens may not be combined before reaching the target tissue. Thus, a structure of the multi-wavelength fiber-optic imaging device may be simplified, and a volume and weight of the multi-wavelength fiber-optic imaging device may be reduced, so that requirements for miniaturization and light weight of the multi-wavelength fiber-optic imaging device may be satisfied and the multi-wavelength fiber-optic imaging device may be applied to application scenarios with high requirements on volume and weight.

According to the multi-wavelength fiber-optic imaging device provided by this embodiment, the second collimating lens serves as a collimating optical element to collimate the first light beams transmitted by the plurality of optical fibers. Since the plurality of first light beams are different in wavelengths, different first light beams correspond to different second focal points. On a plane passing through the second main optical axis, a connection line between an orthographic projection of the second end of the optical fiber corresponding to a first light beam and the second focal point corresponding to the same first light beam is perpendicular to the second main optical axis, so that the second end of the optical fiber corresponding to the first light beam is disposed at the focal plane corresponding to the same first light beam. Further, the extension direction of the rotation axis of the light cone formed by each first light beam emitted from the second end of the optical fiber is capable of being parallel to or coinciding with the extension direction of the second main optical axis, so that collimation of the plurality of first light beams may be realized by the second collimating lens simultaneously, and the axial chromatic aberration during the collimation of the plurality of first light beams may be compensated. Thus, a need for a complex achromatic design in the multi-wavelength fiber-optic imaging device may be avoided, thereby reducing manufacturing cost, volume, and weight of the multi-wavelength fiber-optic imaging device. Further, the plurality of first light beams collimated by the second collimating lens is enabled to conduct imaging of the target tissue without beam combination.

Figure 9:
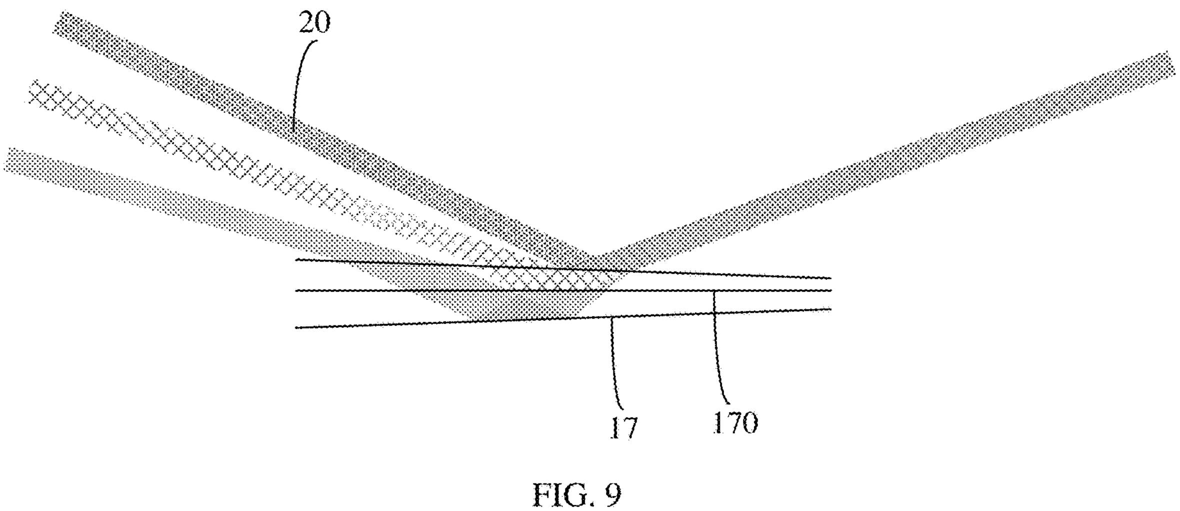
FIG. 9 is a schematic structural diagram of an application scenario applicable to a third beam-combining optical element according to an embodiment of the present disclosure.

FIG. 9 is a schematic structural diagram of an application scenario applicable to a third beam-combining optical element according to an embodiment of the present disclosure. Referring to FIG. 2, FIG. 8, and FIG. 9, the multi-wavelength fiber-optic imaging device 10 may further include a third beam-combining optical element 17. The third beam-combining optical element 17 is disposed between the second collimating lens 141 and the scanner 12. The third beam-combining optical element 17 includes a plurality of second optical coatings 170. Normal directions of the plurality of second optical coatings 170 are arranged to intersect with each other, and the plurality of second optical coatings 170 are in one-to-one correspondence with the plurality of first light beams 20. Each second optical coating 170 is capable of reflecting the corresponding first light beam 20 and transmitting the first light beam 20 other than the corresponding first light beam 20, so that each first light beam 20 is capable of reaching the corresponding second optical coating 170. After the plurality of first light beams 20 are respectively reflected by the corresponding second optical coatings 170, the propagation directions of the plurality of first light beams 20 coincide.

Working principle of the third beam-combining optical element 17 is similar to that of the second beam-combining optical element 16. In some application scenarios, as shown in FIG. 9, after the plurality of first light beams 20 are collimated by the second collimating lens 150, the propagation directions of the plurality of first light beams 20 intersect with each other, and centroids of light spots of beams corresponding to the plurality of first light beams 20 do not coincide. When the plurality of first light beams 20 propagate to the third beam-combining optical element 17, since the plurality of second optical coatings 170 are in one-to-one correspondence with the plurality of first light beams 20, and each second optical coating 170 can reflect the corresponding first light beam 20 and transmit the first light beams 20 other than the corresponding first light beam 20, each first light beam 20 can reach the corresponding second optical coating 170 and be reflected by the corresponding second optical coating 170.

Since the normal directions of the plurality of second optical coatings 170 are arranged to intersect with each other, an incident angle and incident point of the first light beam 20 can be independently adjusted by adjusting a position and angle of the second optical coating 170, so that the centroids of the light spots of the beams corresponding to the plurality of first light beams 20 coincide, and the propagation directions of the plurality of first light beams 20 coincide, thereby realizing combination of the beams corresponding to the plurality of first light beams 20.

Exemplarily, as shown in FIG. 9, the plurality of second optical coatings 170 may be arranged at intervals. Exemplarily, adjacent second optical coatings may alternatively be connected. Exemplarily, the second optical coating may include a dichroic film. Exemplarily, the second optical coating may include a narrow-band reflective film, a wide-band reflective film, or a metal film.

Exemplarily, the plurality of first light beams may pass through the second collimating lens, the third beam-combining optical element, the scanner, and the objective lens in sequence and then reach the target tissue.

The multi-wavelength fiber-optic imaging device provided by this embodiment, further includes the third beam-combining optical element. The third beam-combining optical element includes a plurality of second optical coatings. Normal directions of the plurality of second optical coatings are arranged to intersect with each other, and the plurality of second optical coatings are in one-to-one correspondence with the plurality of first light beams. Each second optical coating is capable of reflecting the corresponding first light beam and transmitting the first light beam other than the corresponding first light beam, so that each first light beam is capable of reaching the corresponding second optical coating and being reflected by the corresponding second optical coating. Thus, centroids of light spots of beams corresponding to the plurality of first light beams may coincide, and propagation directions of the plurality of first light beams collimated by the second collimating lens coincide, thereby realizing combination of beams corresponding to the plurality of first light beams. Further, the same area of the target tissue may be imaged by the first light beams with different wavelengths.

In addition, incident angles and incident points of the first light beams may be independently adjusted by adjusting positions and angles of the second optical coatings. For complex scenarios, such as when a quantity of wavelength types of the first light beams is large, the combination of the beams corresponding to the plurality of first light beams may still be achieved by the third beam-combining optical element, thereby expanding application scenarios of the multi-wavelength fiber-optic imaging device.

Figure 10:
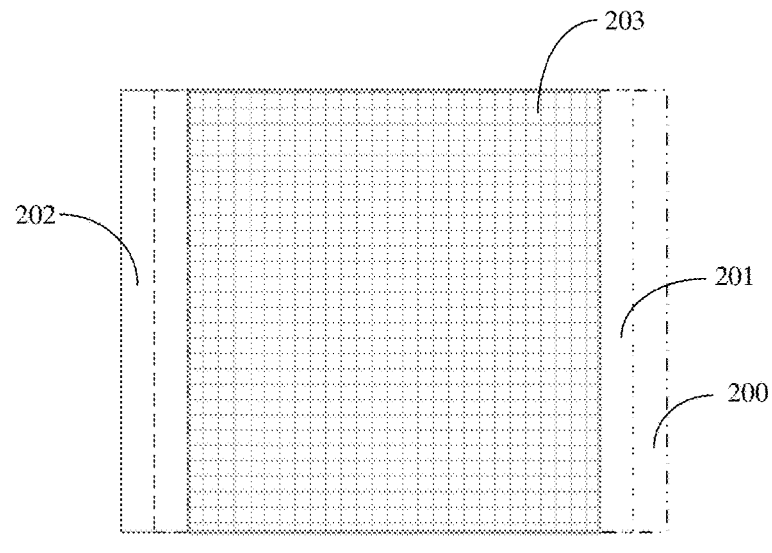
FIG. 10 is a schematic diagram of a field-of-view of a multi-wavelength fiber-optic imaging device according to an embodiment of the present disclosure.

FIG. 10 is a schematic diagram of a field of view of a multi-wavelength fiber-optic imaging device according to an embodiment of the present disclosure. As shown in FIG. 10, each of the plurality of first light beams 20 has a corresponding field of view, and the field of view of the multi-wavelength fiber-optic imaging device 203 is an intersection of the fields of view corresponding to the plurality of first light beams 20.

Since the fields of view of the plurality of first light beams 20 may not completely coincide, for example, when the propagation directions of the plurality of first light beams incident on the objective lens intersect with each other, the intersection of the fields of view corresponding to the plurality of first light beams 20 may be acquired and be determined as a field of view of the multi-wavelength fiber-optic imaging device 10, so that the field of view 203 of the multi-wavelength fiber-optic imaging device may be determined and calibrated, thereby improving imaging quality.

Exemplarily, as shown in FIG. 10, the first light beam 20 is a red-light beam, a blue-light beam or a green-light beam. Three optical fibers 11 respectively transmit the red-light beam, the blue-light beam, and the green-light beam. The red-light beam has a first field of view 200, the blue-light beam has a second field of view 201, and the green-light beam has a third field of view 202. The field of view of the multi-wavelength fiber-optic imaging device 203 may be an intersection of the first field of view 200, the second field of view 201, and the third field of view 202.

Exemplarily, as shown in FIG. 8, the plurality of first light beams collimated by the second collimating lens may not be combined before reaching the target tissue. Propagation directions of the plurality of first light beams intersect with each other, and fields of view corresponding to the plurality of first light beams do not completely coincide. A common part of the fields of view corresponding to the plurality of first light beams may be intercepted, so that the first light beams with different wavelengths may reach the same area of the target tissue, and the same area of the target tissue may provide feedback for the first light beams with different wavelengths, thereby improving imaging quality of the target tissue.

Figure 11:
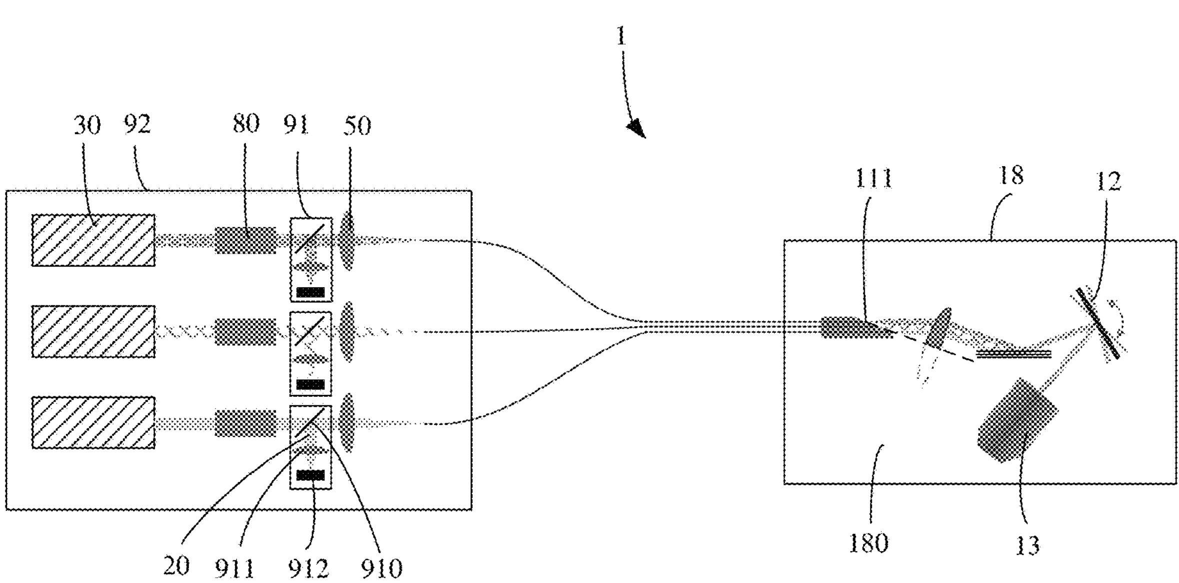
FIG. 11 is a schematic structural diagram of an application scenario applicable to a multi-wavelength fiber-optic imaging system according to an embodiment of the present disclosure.

FIG. 11 is a schematic structural diagram of an application scenario applicable to a multi-wavelength fiber-optic imaging system according to an embodiment of the present disclosure. The multi-wavelength fiber-optic imaging device 10 may be applied to a multi-wavelength fiber-optic imaging system 1.

In some embodiments, as shown in FIG. 11, the multi-wavelength fiber-optic imaging device 10 may further include a probe 18, and the probe 18 has an accommodating space 180. The accommodating space 180 is configured to accommodate the second ends of the plurality of optical fibers 111, the scanner 12, and the objective lens 13. By integrating the second ends of the plurality of optical fibers, the scanner, and the objective lens into the probe, the probe may protect the aforementioned structures, and a shape and size of the probe may be designed according to an actual application, so that the multi-wavelength fiber-optic imaging device may be applied to more application scenarios.

Exemplarily, the second end of the optical fiber, the scanner, and the objective lens are all connected to the probe, so that these structures may be protected by the probe. Exemplarily, the multi-wavelength fiber-optic imaging device or the probe integrated with the second ends of the optical fibers, the scanner, and the objective lens may be used as an endoscope, that is, an in-vivo clinical examination tool, to observe an internal cavity of animals or humans, and may alternatively be used as a handheld multi-wavelength fiber-optic imaging device or a wearable multi-wavelength fiber-optic imaging device.

Exemplarily, the accommodating space may be further configured to accommodate the collimating optical element. For example, the accommodating space may be further configured to accommodate the first collimating lens, and may be alternatively configured to accommodate the second collimating lens. Exemplarily, the accommodating space may further accommodate the first collimating lens and the first beam-combining optical element, and alternatively may further accommodate the first collimating lens and the second beam-combining optical element. Exemplarily, the accommodating space may alternatively further accommodate the second collimating lens and the third beam-combining optical element.

As shown in FIG. 11, an embodiment of the present disclosure further provides a multi-wavelength fiber-optic imaging system 1. The multi-wavelength fiber-optic imaging system 1 may include: the multi-wavelength fiber-optic imaging device 10 mentioned in any of the above embodiments and a multi-wavelength light source 40. The multi-wavelength light source 40 are respectively disposed at first-light-beam receiving sides of the plurality of optical fibers 113, and are configured to respectively provide the first light beams 20 with different wavelengths to the first ends of the plurality of optical fibers 110.

Specifically, the first-light-beam receiving side of the optical fiber 113 is a side of the optical fiber 11 configured to receive the first light beam 20. Further, the first-light-beam receiving side of the optical fiber 113 is a side of a first end of the optical fiber 110 configured to receive the first light beam 20. Exemplarily, the light sources 40 are in one-to-one correspondence with the first light beams 20. A quantity of the light sources 40 may be the same as a quantity of wavelength types of the first light beams 20. Exemplarily, the light source may include a continuous laser, a pulsed laser, or a light-emitting diode.

Exemplarily, the multi-wavelength fiber-optic imaging system may be a distal-end scanning multi-wavelength fiber-optic imaging system. The second ends of the optical fibers, the scanner, and the objective lens may be located at a distal end, and the first ends of the optical fibers and the light sources may be located at a proximal end.

Since the multi-wavelength fiber-optic imaging system 1 includes the multi-wavelength fiber-optic imaging device 10, the multi-wavelength fiber-optic imaging system 1 has all the technical features and technical effects of the multi-wavelength fiber-optic imaging device 10. The technical features and technical effects of the multi-wavelength fiber-optic imaging system will not be repeated herein again.

In some application scenarios, the multi-wavelength fiber-optic imaging system 1 may further include a module for collecting the plurality of second light beams to convert optical signals into electrical signals and generate an image of the target tissue. Methods of collecting the plurality of second light beams and using the plurality of second light beams to generate the image of the target tissue may be implemented by using common knowledge or conventional technologies in the field, and will not be repeated herein again.

Figure 12:
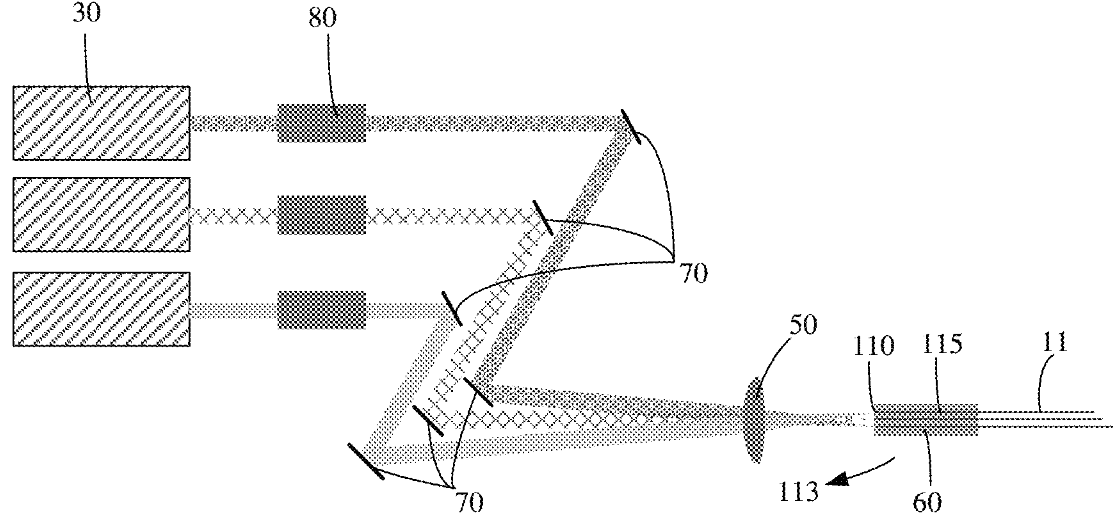
FIG. 12 is a schematic structural diagram of an application scenario applicable to optical fibers and light sources according to an embodiment of the present disclosure.

FIG. 12 is a schematic structural diagram of an application scenario applicable to optical fibers and light sources according to an embodiment of the present disclosure.

In some embodiments, as shown in FIG. 1, FIG. 11, and FIG. 12, the multi-wavelength fiber-optic imaging system 1 may further include at least one coupler 50. The at least one coupler 50 is disposed between the multi-wavelength light source 40 and first ends of the corresponding optical fibers 110, and is configured to couple the first light beam 20 provided by at least one light source 40 to the first end of the corresponding optical fiber 110.

Exemplarily, the coupler may include a gradient index lens, a spherical lens, an aspherical lens, a cemented lens, or a lens group. For example, the coupler may be a microscopic objective lens.

Exemplarily, as shown in FIG. 1 and FIG. 11, the multi-wavelength fiber-optic imaging system 1 may include a plurality of couplers 50. The plurality of couplers 50, the light sources 40, and the optical fibers 11 correspond to each other in a one-to-one correspondence Each coupler 50 may be configured to couple a first light beam 20 provided by a corresponding light source 40 to a first end of a corresponding optical fiber 110. For example, when differences in parameters, such as mode field diameters and numerical apertures, of the plurality of optical fibers are large, each first light beam may be coupled to the first end of the corresponding optical fiber by the corresponding coupler.

Exemplarily, as shown in FIG. 12, the multi-wavelength fiber-optic imaging system 1 may include one coupler 50. The coupler 50 may be configured to couple the first light beams 20 provided by the multi-wavelength light source 40 to the first ends of the corresponding optical fibers 110. For example, when differences in parameters, such as mode field diameters and numerical apertures, of the plurality of optical fibers are small, the plurality of first light beams may be coupled to the first ends of the corresponding optical fibers by the same coupler.

In some embodiments, as shown in FIG. 12, the multi-wavelength fiber-optic imaging system 1 may further include a second optical fiber ferrule 60. For each optical fiber 11, the first end of the optical fiber 110 may be a tail end of a first end portion of the optical fiber 115. The first end portions of the plurality of optical fibers 115 may be inserted into the same second optical fiber ferrule 60, so that fixation of the first ends of the plurality of optical fibers 110 is realized, an overall circumferential size of the first end portions of the plurality of optical fibers 115 may be reduced. Meanwhile, the first light beams 20 provided by the multi-wavelength light source 40 may be coupled to the corresponding first ends of the optical fibers 110 by the same coupler 50.

In some embodiments, as shown in FIG. 12, the multi-wavelength fiber-optic imaging system 1 may further include at least one reflecting mirror 70. The reflecting mirror 70 is disposed between the light source 40 and the coupler 50, and is configured to reflect the first light beam 20. The propagation direction of the first light beam provided by the light source is changed by the reflecting mirror, so as to adjust an angle at which the first light beam enters the coupler. Thus, different first light beams are enabled to enter the first ends of the plurality of optical fibers at different positions through the same coupler, and the first light beams with different wavelengths may be coupled into the corresponding optical fibers by the same coupler, thereby improving coupling efficiency.

In some embodiments, as shown in FIG. 1, FIG. 11, and FIG. 12, the multi-wavelength fiber-optic imaging system 1 may further include at least one light modulator 80. The light modulator 80 is disposed between the light source 40 and the coupler 50, and is configured to control an intensity of the first light beam 20 provided by the light source 40. An optical power or intensity of the first light beam output by the light source may be adjusted by the light modulator, so that requirement for the optical power or the intensity of the first light beam required for imaging the target tissue may be satisfied.

Exemplarily, the light sources 40 are in one-to-one correspondence with the light modulators 80. Exemplarily, the light modulator may include an electro-optic crystal modulator, an acousto-optic crystal modulator, or a liquid crystal modulator. Exemplarily, the light modulator may alternatively include a mechanically rotating half-wave plate and a polarization-dependent beam splitter.

Exemplarily, as shown in FIG. 4, in a case where the plurality of first light beams pass through the first collimating lens, the scanner, and the objective lens in sequence and then reach the target tissue, that is, in a case where the plurality of first light beams collimated by the first collimating lens are not combined before reaching the target tissue, after the plurality of first light beams are collimated by the first collimating lens, the propagation directions of the plurality of first light beams are parallel but not coincident. There is a tiny spacing between centroids of light spots corresponding to the plurality of first light beams, and the centroids of the light spots corresponding to the plurality of first light beams do not coincide.

Since an overall size of the centroids of the light spots corresponding to the plurality of first light beams may be greater than an entrance pupil diameter of the multi-wavelength fiber-optic imaging device, at least part of light beam corresponding to at least one first light beam is blocked by a diaphragm, resulting in a reduction in an effective optical power of the first light beam from the objective lens. At this time, the optical power or the intensity of the first light beam blocked by the diaphragm may be increased by the light modulator, so as to compensate for reduction in the effective optical power of the first light beam from the objective lens. Thus, even when the plurality of first light beams collimated by the first collimating lens are not combined before reaching the target tissue, high-quality imaging of the target tissue can still be achieved. Moreover, the multi-wavelength fiber-optic imaging device does not need to be equipped with a beam-combining optical element, and the entrance pupil diameter may be designed to be smaller, facilitating reduction in a volume and weight of the multi-wavelength fiber-optic imaging device, so that the multi-wavelength fiber-optic imaging device may be applied in scenarios with a high requirement on volume and weight. For example, the multi-wavelength fiber-optic imaging device may be configured as an endoscope or a wearable multi-wavelength fiber-optic imaging device.

In some embodiments, as shown in FIG. 11, the objective lens 13 is further configured to receive second light beams 90 feedback by the target tissue 30 after the first light beams 20 are incident on the target tissue 30, and output the second light beams 90 to the scanner 12. The scanner 12 is further configured to output the received second light beams 90 to the second ends of the optical fibers 111. The first ends of the optical fibers 110 are further configured to output the second light beams 90.

In some embodiments, as shown in FIG. 11, the multi-wavelength fiber-optic imaging system 1 may further include a second light beam collection module 91. The second light beam collection module 91 is disposed between the light source 40 and the coupler 50, and is configured to collect the second light beam 90. The coupler 50 is further configured to couple the second light beam 90 output by the first end of the optical fiber 110 to the second light beam collection module 91.

Exemplarily, as shown in FIG. 11, the second light beam collection module 91 may include a beam splitter 910 and a photoelectric conversion module 911. The beam splitter 910 is disposed between the coupler 50 and the light source 40, and is capable of transmitting the first light beam 20 and reflecting the second light beam 90. The photoelectric conversion module 911 is disposed at a side of the beam splitter 910 where the second light beam 90 is reflected, and is configured to convert the received second light beam 90 into an electrical signal.

Exemplarily, the beam splitter 910 may include one or more of optical elements including a dichroic mirror, a prism, and a grating. Exemplarily, the photoelectric conversion module 911 may include a photodetector.

Exemplarily, the second light beam collection module 91 may further include a condensing lens 912. The condensing lens 912 is disposed between the beam splitter 910 and the photoelectric conversion module 911, and is configured to focus the second light beam 90 reflected by the beam splitter 910 onto the photoelectric conversion module 911.

In some embodiments, the multi-wavelength fiber-optic imaging system 1 may further include a host machine 92. The host machine 92 may integrate the first ends of the optical fibers 110 and the light sources 40. The host machine 92 may further integrate the coupler 50, the light modulator 80, and the reflector 70. Additionally, the host machine 92 may integrate the second light beam collection module 91.

Exemplarily, the host machine may further integrate a system on chip (SOC) or a field programmable gate array (FPGA), and the SOC or the FPGA is configured to process an electrical signal provided by the photodetector.

In some embodiments, the objective lens is further configured to receive the plurality of second light beams with different wavelengths. The multi-wavelength fiber-optic imaging device may further include a dichroic mirror and an imaging optical fiber. The dichroic mirror is disposed between the objective lens and the scanner, and is capable of transmitting the plurality of first light beams and reflecting the plurality of second light beams. One end of the imaging optical fiber is located at a second-light-beam output side of the dichroic mirror, and is configured to receive the plurality of second light beams reflected by the dichroic mirror. The other end of the imaging optical fiber is configured to output the plurality of second light beams from the dichroic mirror, so that the plurality of second light beams can be collected. The multi-wavelength fiber-optic imaging system may further include a photoelectric conversion imaging module. The photoelectric conversion imaging module is disposed at a second-light-beam output side of the imaging optical fiber and is configured to receive the plurality of second light beams and convert the received plurality of second light beams into electrical signals, so as to generate an image of the target tissue.

The above describes the basic principle of the present disclosure in conjunction with specific embodiments. However, it should be pointed out that the advantages, benefits, effects, and the like mentioned in the present disclosure are only examples and not limitations, and cannot be considered as essential for each embodiment of the present disclosure. In addition, the specific details disclosed above are only to provide examples and facilitate understanding, and are not limited. The above details do not limit the necessity for the present disclosure to use the above specific details for implementation.

The block diagrams of the device, apparatus, equipment, and system involved in the present disclosure are only illustrative examples and are not intended to require or imply that the connections, arrangements, and configurations must be made in the manner shown in the block diagrams. As will be recognized by those skilled in the art, the device, apparatus, equipment, and system can be connected, arranged, and configured in any way. Words such as "including", "comprising", "having", and the like are open-ended terms referring to "including but not limited to" and can be used interchangeably. The terms "or" and "and" used here refer to the word "and/or" and can be used interchangeably, unless the context clearly indicates otherwise. The term "such as" used here refers to the phrase "such as but not limited to" and can be used interchangeably.

It should further be pointed out that in the device, equipment, and method of the present disclosure, each component or step can be decomposed and/or recombined. The decompositions and/or recombination should be considered equivalent solutions to the present disclosure.

Provide the above description of the disclosed aspects to enable any person skilled in the art to make or use the present disclosure. The various modifications to the aspects are very obvious to those skilled in the art, and the general principles defined here can be applied to other aspects without departing from the scope of the present disclosure. Therefore, the present disclosure is not intended to be limited to the aspects shown herein, but rather to the widest range consistent with the principles and novel features disclosed herein.

For the purpose of illustration and description, the above description has been provided. Furthermore, this description is not intended to limit the embodiments of the present disclosure to the form disclosed herein. Although multiple exemplary aspects and embodiments have been discussed above, those skilled in the art will recognize certain variations, modifications, alterations, additions, and sub-combinations thereof.

What is claimed is:

1. A multi-wavelength fiber-optic imaging device, comprising:

a plurality of optical fibers, configured to transmit a plurality of first light beams respectively, wherein the plurality of first light beams transmitted by the plurality of optical fibers are different in wavelengths, a first end of an optical fiber is configured to receive a first light beam, and a second end of the optical fiber is configured to output the first light beam;

a scanner, disposed at a first-light-beam output side of the plurality of optical fibers, configured to receive the plurality of first light beams emitted from second ends of the plurality of optical fibers and change propagation directions of the plurality of first light beams to realize imaging scanning;

an objective lens, disposed at a first-light-beam output side of the scanner, configured to focus the plurality of first light beams on the target tissue, to conduct imaging of the target tissue; and a collimating optical element, disposed between the plurality of optical fibers and the scanner, configured to collimate the plurality of first light beams emitted from the second ends of the plurality of optical fibers;

wherein the collimating optical element comprises a first collimating lens disposed between the plurality of optical fibers and the scanner, and the first collimating lens is configured to collimate the plurality of first light beams emitted from the second ends of the plurality of optical fibers;

the first collimating lens has a plurality of first focal points located on a first main optical axis, the plurality of first focal points respectively correspond to the plurality of first light beams, and the second end of the optical fiber corresponding to the first light beam is located at a first focal point corresponding to the same first light beam, to make the propagation directions of the plurality of first light beams emitted from the first collimating lens parallel.

2. The multi-wavelength fiber-optic imaging device according to claim 1, wherein the first collimating lens comprises a lens with an Abbe number less than a preset value and/or a lens group, to increase a distance between adjacent first focal points.

3. The multi-wavelength fiber-optic imaging device according to claim 1, further comprising:

a first beam-combining optical element, disposed between the first collimating lens and the scanner, wherein the first beam-combining optical element has a first refractive surface and a second refractive surface parallel to each other, when the plurality of first light beams with parallel propagation directions propagate to the first refractive surface, incident angles of the plurality of first light beams are greater than 0° and less than 90°, the plurality of first light beams are capable of entering the first beam-combining optical element from the first refractive surface and being emitted from the first beam-combining optical element from the second refractive surface, and after the plurality of first light beams exit the second refractive surface, the propagation directions of the plurality of first light beams coincide.

4. The multi-wavelength fiber-optic imaging device according to claim 1, further comprising:

a second beam-combining optical element, disposed between the first collimating lens and the scanner, wherein the second beam-combining optical element comprises a plurality of first optical coatings arranged parallel to each other and spaced apart, the plurality of first optical coatings are in one-to-one correspondence with the plurality of first light beams, and each first optical coating is capable of reflecting the corresponding first light beam and transmitting the first light beam other than the corresponding first light beam, so that each first light beam is capable of reaching the corresponding first optical coating, and after the plurality of first light beams are respectively reflected by the corresponding first optical coatings, the propagation directions of the plurality of first light beams coincide.

5. The multi-wavelength fiber-optic imaging device according to claim 1, further comprising:

a probe, provided with an accommodation space to accommodate the second ends of the plurality of optical fibers, the scanner, and the objective lens.

6. A multi-wavelength fiber-optic imaging system, comprising:

the multi-wavelength fiber-optic imaging device according to claim 1; and a multi-wavelength light source, disposed at the first-light-beam receiving side of the plurality of optical fibers, configured to provide the plurality of first light beams with different wavelengths to the first ends of the plurality of optical fibers respectively.

7. The multi-wavelength fiber-optic imaging system according to claim 6, further comprising:

at least one coupler, disposed between the multi-wavelength light source and the first end of the corresponding optical fiber, configured to couple a first light beam provided by at least one light source to the first end of the corresponding optical fiber.

8. The multi-wavelength fiber-optic imaging system according to claim 7, wherein the coupler comprises at least one of a gradient index lens, a spherical lens, an aspherical lens, a cemented lens, and a lens group.

9. The multi-wavelength fiber-optic imaging system according to claim 7, further comprising: an optical fiber ferrule, wherein the first end of the optical fiber is a tail end of a first end portion of the optical fiber, and first end portions of the plurality of optical fibers are inserted into the optical fiber ferrule.

10. The multi-wavelength fiber-optic imaging system according to claim 7, further comprising: at least one reflecting mirror disposed between the multi-wavelength light source and the at least one coupler, wherein the reflecting mirror is configured to reflect the plurality of first light beams to change the propagation directions of the plurality of first light beams to enable the plurality of first light beams to enter the first ends of the plurality of optical fibers through a same coupler.

11. The multi-wavelength fiber-optic imaging system according to claim 7, further comprising: at least one light modulator disposed between the multi-wavelength light source and the at least one coupler, wherein the light modulator is configured to control an intensity of the first light beam.

12. The multi-wavelength fiber-optic imaging system according to claim 7, wherein the objective lens is further configured to receive second light beams feedback by the target tissue and output the second light beams to the scanner; and the scanner is further configured to output the second light beams to the second ends of the plurality of optical fibers.

13. The multi-wavelength fiber-optic imaging system according to claim 12, further comprising: a second light beam collection module disposed between the multi-wavelength light source and the at least one coupler, wherein the second light beam collection module is configured to collect the second light beams; and the coupler is further configured to couple the second light beams output by the first ends of the plurality of optical fibers to the second light beam collection module.

14. The multi-wavelength fiber-optic imaging system according to claim 13, wherein the second light beam collection module further comprises a beam splitter and a photoelectric conversion module, wherein the beam splitter is disposed between the multi-wavelength light source and the at least one coupler and is capable of transmitting the first light beams and reflecting the second light beams; and the photoelectric conversion module is disposed at a side of the beam splitter reflecting the second light beams, and is configured to convert the received second light beams into an electrical signal.

15. The multi-wavelength fiber-optic imaging system according to claim 14, wherein the second light beam collection module further comprises a condensing lens disposed between the beam splitter and the photoelectric conversion module, and the condensing lens is configured to focus the second light beams reflected by the beam splitter into the photoelectric conversion module.

16. A multi-wavelength fiber-optic imaging device, comprising:

a plurality of optical fibers, configured to transmit a plurality of first light beams respectively, wherein the plurality of first light beams transmitted by the plurality of optical fibers are different in wavelengths, a first end of an optical fiber is configured to receive a first light beam, and a second end of the optical fiber is configured to output the first light beam;

a scanner, disposed at a first-light-beam output side of the plurality of optical fibers, configured to receive the plurality of first light beams emitted from second ends of the plurality of optical fibers and change propagation directions of the plurality of first light beams to realize imaging scanning;

an objective lens, disposed at a first-light-beam output side of the scanner, configured to focus the plurality of first light beams on the target tissue, to conduct imaging of the target tissue; and a collimating optical element, disposed between the plurality of optical fibers and the scanner, configured to collimate the plurality of first light beams emitted from the second ends of the plurality of optical fibers;

wherein the collimating optical element comprises a second collimating lens disposed between the plurality of optical fibers and the scanner, and the second collimating lens is configured to collimate the first light beams emitted from the second ends of the plurality of optical fibers, and the second collimating lens has a second main optical axis;

an extension direction of a rotation axis of a light cone formed by each first light beam emitted from the second end of the optical fiber is parallel to or coinciding with an extension direction of the second main optical axis; and the second collimating lens has a plurality of second focal points and a plurality of focal planes, the plurality of second focal points are in one-to-one correspondence with the plurality of first light beams, each focal plane comprises one second focal point, and the second end of the optical fiber corresponding to the first light beam is disposed at the focal plane corresponding to the same first light beam.

17. The multi-wavelength fiber-optic imaging device according to claim 16, further comprising:

a third beam-combining optical element, disposed between the second collimating lens and the scanner, wherein the third beam-combining optical element comprises a plurality of second optical coatings, normal directions of the plurality of second optical coatings are arranged to intersect with each other, the plurality of second optical coatings are in one-to-one correspondence with the plurality of first light beams, and each second optical coating is capable of reflecting the corresponding first light beam and transmitting the first light beam other than the corresponding first light beam, so that each first light beam is capable of reaching the corresponding second optical coating, and after the plurality of first light beams are respectively reflected by the corresponding second optical coatings, the propagation directions of the plurality of first light beams coincide, and each of the plurality of first light beams has a corresponding field of view, and a field of view of the multi-wavelength fiber-optic imaging device is an intersection of the fields of view corresponding to the plurality of first light beams.

* * * * *